No. 635,088. Patented Oct. 17, 1899.
E. N. BOWKER.
INSIDE CALIPERS.
(Application filed July 24, 1899.)
(No Model.)
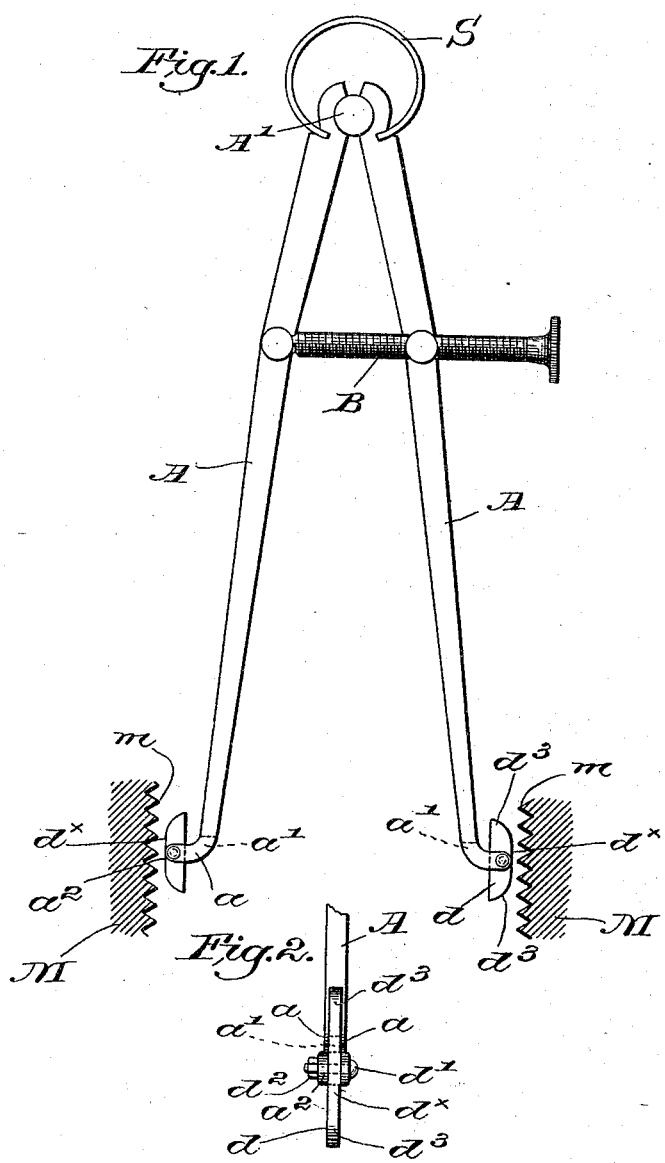
Witnesses.
George L. Dolbeare
Thomas J. Drummond
Inventor.
Edward N. Bowker,
by Crosby & Gregory
Attys.

UNITED STATES PATENT OFFICE.

EDWARD N. BOWKER, OF BATH, MAINE.

INSIDE CALIPERS.

SPECIFICATION forming part of Letters Patent No. 635,088, dated October 17, 1899.

Application filed July 24, 1899. Serial No. 724,882. (No model.)

*To all whom it may concern:*

Be it known that I, EDWARD N. BOWKER, of Bath, county of Sagadahoc, State of Maine, have invented an Improvement in Inside Calipers, of which the following description, in connection with the accompanying drawings, is a specification, like letters on the drawings representing like parts.

This invention has for its object the production of simple and accurate inside calipers whereby internal-threaded or other irregular surfaces may be calipered with great exactness.

Heretofore the calipering of inside-threaded surfaces has, so far as I am aware, been attended with considerable uncertainty, owing to the difficulty of accurately placing the engaging portions of the calipers upon the threads.

In accordance with my invention the engaging portions of the two separable members of the calipers are elongated and made plane, the engaging parts being pivotally mounted upon the separable members and held frictionally in position thereupon, so that after the object to be calipered has been tested the calipers can be withdrawn and the measurement read off in any suitable manner upon a scale of ordinary construction, the distance between the plane faces of the engaging members being the exact distance calipered.

Figure 1 is a front elevation of a well-known form of calipers with my invention applied thereto, and Fig. 2 is an enlarged edge view of one of the engaging parts or dogs and the adjacent part of the leg or supporting member.

While I have herein shown my invention as applied to spring-calipers, it is to be understood that any other suitable form of calipers may be used instead thereof.

The adjustable separable supporting members or legs A, pivotally connected at A' and notched to receive a spring S, and the adjusting device B to maintain the legs in adjusted position are and may be of usual and well-known construction.

In accordance with my present invention the free ends of the legs are bent outwardly, as at $a$, and longitudinally slotted, as at $a'$, Fig. 1, the extremities of the bent or outturned portions being rounded, as at $a^2$, the curve being struck from the pivotal point of the dog to be described. Each leg is provided with an engaging part or dog $d$, preferably made as a piece of thin flat hardened steel, inserted in the slotted end of each leg and retained in position by a headed fulcrum-screw $d'$, provided at its opposite end with a nut $d^2$, the outer face of each dog having an elongated plane portion $d^\times$, which merges into tangent curves $d^3$ at each end. The plane face $d^\times$ of the dog is tangent to the rounded extremity $a^2$ of the adjacent leg, as clearly shown in Fig. 1. The center of the pivot or fulcrum $d'$ forms the center of curvature of such extremity $a^2$.

Suppose it is desired to caliper an internally-threaded pipe, as M, Fig. 1. The legs of the calipers are inserted in the tube and separated until the plane faces $a^2$ of the dogs engage the threads $m$, the length of the faces being such that two or more threads will be engaged by each dog, the latter being placed in parallelism by engagement with the surface to be calipered. The nut $d^2$ of each pivot stud or screw is tightened up sufficiently to retain the dog frictionally in any position in which it may thus be left. When the measurement has been taken, as described, the calipers will be withdrawn, and by applying a scale to the outer faces of the dogs the exact distance between them can be readily ascertained.

It will be manifest that my improved calipers can be used for any form of inside measurement; but they are particularly useful in calipering threaded pipes, tubes, &c.

The rounded ends $d^3$ of the dogs prevent the latter from catching upon inequalities in the surfaces to be calipered.

My invention is not restricted to the precise construction and arrangement herein shown and described, as the same may be varied and rearranged without departing from the scope of my invention.

Having fully described my invention, what I claim, and desire to secure by Letters Patent, is—

1. Inside calipers comprising adjustably-separable members, a dog fulcrumed midway between the ends of its contact-face on the extremity of each leg, each dog having an elongated, plane contact-face to engage the surface to be calipered, and adjustable means to frictionally maintain the dogs in set position, substantially as described.

2. Inside calipers comprising separable legs turned out at their tips, and a dog fulcrumed on each, to engage the surface to be calipered, the plane contact-face of each dog being tangential to the adjacent supporting-tip, substantially as described.

3. Inside calipers comprising adjustable legs, and a dog fulcrumed on each midway between the ends of their contact-faces, each dog having an elongated, plane face to engage the surface to be calipered, and rounded ends tangent to said face, substantially as described.

4. Inside calipers comprising pivoted legs having outturned, longitudinally-slotted tips, and a surface-engaging dog pivotally connected to the tip of each leg within the slot, and means to frictionally maintain the dogs in set position, each dog having a plane, outer engaging face.

5. Inside calipers comprising adjustably-separable members, each having a longitudinally-slotted and rounded end, and a thin, elongated dog pivotally mounted in each slot and having its outer, plane engaging face tangential to the adjacent rounded end of the supporting member.

6. Inside calipers comprising pivotally-connected legs bent out at their free ends and slotted longitudinally thereat, a flat dog pivoted in each slot and having an elongated plane engaging face, a headed pivot-screw extended through the slotted portion of each leg and the dog, and a nut for each screw, to regulate the friction of the adjacent portion of the leg upon the dog.

In testimony whereof I have signed my name to this specification in the presence of two subscribing witnesses.

EDWARD N. BOWKER.

Witnesses:
 THOMAS BOWKER,
 EUGENE W. JOHNSON.